Feb. 2, 1960
W. A. DICKIE ET AL
2,923,034
PROCESS FOR THE MANUFACTURE OF FILTER BODIES
Filed June 25, 1956
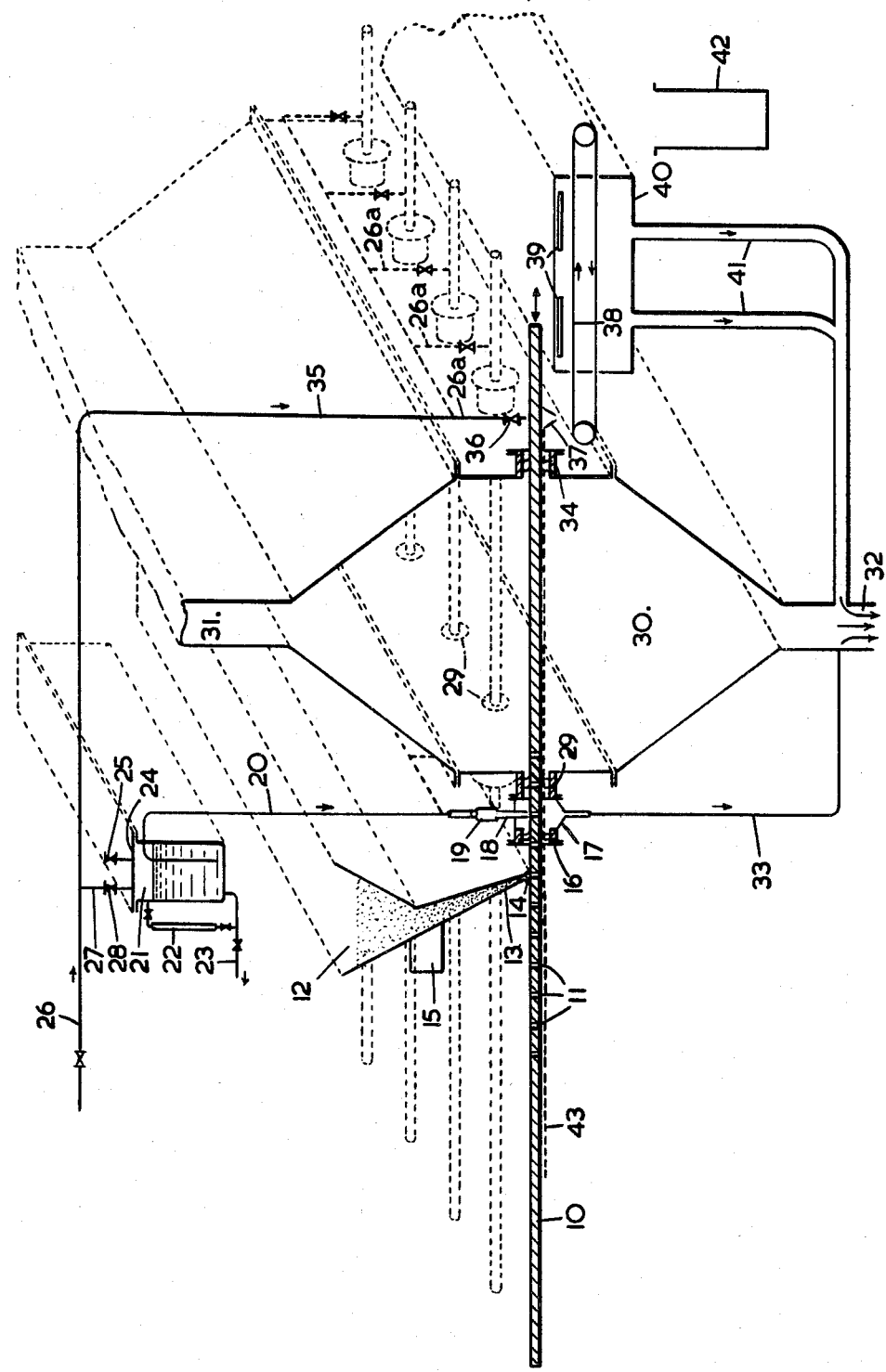

United States Patent Office 2,923,034
Patented Feb. 2, 1960

2,923,034

PROCESS FOR THE MANUFACTURE OF FILTER BODIES

William Alexander Dickie, London, and Boleslaw Krzesinski and Donald Finlayson, Spondon, near Derby, England, assignors to British Celanese Limited, a British company Application June 25, 1956, Serial No. 593,425

Claims priority, application Great Britain June 29, 1955

10 Claims. (Cl. 18—48)

This invention relates to filter bodies and provides a new process and apparatus for making filter bodies (and especially filter-tips for cigarettes) of cellulose acetate or other organic substitution derivative of cellulose.

According to the process of the present invention a filter body is made by loosely charging a space of the shape required in said body (preferably cylindrical) with particles of an organic substitution derivative of cellulose, forming the particles into a coherent porous mass by spraying them with a solvent for the cellulose derivative and causing a current of air to pass through said space to evaporate excess of said solvent, and ejecting the coherent body of particles from said space, the said body being heated at an appropriate stage in the process to complete the evaporation of the solvent. The necessary heating may be effected before ejection, e.g. while air is being passed through the space containing the material, or in part before and in part after the ejection or (as is preferred) wholly after ejection.

Cellulose acetate is particularly suitable as the cellulose derivative and the invention will be described with particular reference to the use of this material.

The cellulose acetate employed may be a commercial product such as is used in the manufacture of cellulose acetate fibres or plastics and having for instance an acetyl value (expressed as acetic acid) of 52 to 56%. Cellulose acetate of higher acetyl value can be employed, i.e. between 56 and 62.5%, as can cellulose acetate of acetyl value somewhat below 52%, e.g. 51 to 52%. The degree of polymerisation as determined by viscosity may be such that a 6% solution of the cellulose acetate in 95% aqueous acetone at 25° C. has a viscosity between about 40 cps. and 400 cps. A particularly useful range of degree of polymerisation is that giving a range of viscosity (under the conditions specified above) of about 70 to 110 cps. Suitable non-toxic and tasteless plasticisers for the cellulose acetate, e.g. triacetin, may be employed in the composition for making the filter tips of the invention. Or the tips may be formed from unplasticised particles of cellulose acetate.

The particles employed should preferably be substantially uniform in size and also in shape. Particles approaching spherical in shape are to be preferred but are not essential; satisfactory products can be formed from particles irregularly shaped such as are obtainable by grinding commercial cellulose acetate flakes and screening the ground product so as to obtain substantial uniformity of particle size.

It is an advantage in making cellulose acetates for the purpose of the invention, to carry out precipitation very slowly thus, for example, when acetylation is carried out in a medium of acetic acid, precipitation of the ripened cellulose acetate may be effected by a very gradual addition of aqueous acetic acid with constant stirring. Other methods of precipitation may be adopted to obtain the cellulose acetate in suitable particle form. Thus, for example, the ripened solution obtained after acetylation in acetic acid may be precipitated by spraying into water in such a way that the solution at the moment of contacting the water is in the form of minute droplets. The ripened solution may for instance be sprayed into a body or stream of water, or into contact with a fine aqueous spray; or water may be sprayed into the cellulose acetate solution.

A method of precipitation that is particularly suitable when a highly volatile acetylation medium such as methylene chloride is used, is to spray the solution into a heated atmosphere or on to a heated surface, e.g. on to a hot rotating drum from which the powder deposited is continuously removed by a doctor blade. Similar methods of precipitation could of course be employed on a solution made by dissolving cellulose acetate flakes in a suitable solvent, e.g. acetone.

Suitable particles can also be obtained by cutting up and/or grinding spun or extruded cellulose acetate fibre. Cellulose acetate spinning waste fibre for instance can be treated in this way. Yarn, tows or monofils of cellulose acetate can also be reduced by cutting or grinding to suitable particle size. Grinding may be effected dry or under water. Fibrous material may be reduced to appropriate particle size by a beater such as is used in paper manufacture, set to give minimum fibre length, and the resulting pulp can then be dried to give the particles required. Various forms of colloid mill may be employed for reducing the material to the desired particle size.

By a solvent for the cellulose acetate is meant a liquid capable of dissolving the cellulose acetate in the surface of the particles at the maximum temperature reached in the process.

It is an important feature of the invention that the bonding together of the particles into a coherent porous body is effected by dissolving the cellulose acetate in the surface of the particles (so forming a thin layer of solution connecting the particles but not filling the spaces between them), and hardening this layer by evaporation of the solvent. This hardening by evaporation produces a particularly strong bond not dependent upon pressure between one particle and another. It is an advantage of the process that the bonding can be effected substantially without compression. A further advantage (for instance over processes in which aqueous adhesives or precipitants are used) is the rapidity with which the process can be effected.

For cellulose acetate of acetyl value (expressed as throughout this specification as acetic acid) 52 to 56%, acetone is a particularly valuable solvent having the advantages of cheapness, substantial non-toxicity and a convenient degree of volatility. Other solvents that can be used include dioxane, chloroform, and methylene chloride. These liquids however are toxic and suitable precautions must therefore be taken when using them. These various solvents can also be used with cellulose acetates of acetyl value up to 62.5% since, although incapable of completely dissolving such acetates they have a sufficient solvent action to effect the necessary bonding. Various solvent mixtures can also be employed, e.g. acetone-ethanol (1:1 by volume) methylene chloride-methanol (1:1 to 9:1 by volume) methylene chloride-ethanol (1:1 to 9:1 by volume). Solvent mixtures containing a major proportion of water are unsatisfactory and are excluded from the ambit of the invention, but solvent mixtures containing a limited proportion of water (up to 30% by volume) may be employed provided that the mixture as a whole is sufficiently volatile to be readily removed by evaporation while retaining its solvent power.

In general terms, apparatus for carrying out the process of the invention comprises: a mould having an open-ended mould space of the shape desired in the filter body (preferably cylindrical); means for loosely charging said space with cellulose acetate particles;

means for spraying solvent on the particles within said space; means for causing a current of air to pass through said space; means for ejecting the coherent body of particles from said space without unduly compressing said body; and means for heating said body at an appropriate stage to complete the evaporation of the solvent.

The process can be carried out in a continuous or semi-continuous way by moving a number of mould spaces in succession past a charging station, a solvent spraying station, a station where air is blown through the mould space, an ejection station and a heating station in which evaporation of the solvent is completed. Or the heating to complete solvent evaporation may be effected at the station where air is blown through the mould spaces or at a station between the last mentioned station and the ejection station. The mould spaces are preferably moved in turn through the various stations in a number of steps each taking the same time and with a dwell equal to said time between each two stations, the various operations specified above being effected during the dwell periods. The mould spaces may move along a closed path or the motion may be reciprocating, the various operations being effected during one half of the stroke and the other half returning the mould spaces to their initial positions. Ejection is preferably effected by an air blast. This avoids substantial compression of the mass of coherent particles. It is a remarkable fact that the filter bodies of the invention can be ejected in this way. The reason is probably some slight shrinkage of the body of particles as a result of the action of the solvent. When the process is carried out continuously or semi-continuously the valves controlling the spray and the ejection air stream are controlled automatically so that each valve opens when a mould space, after travelling forward, has come to rest beneath the orifice controlled by that valve and closes again before the mould space resumes its forward movement. When there is a rearward movement of the mould spaces the valves remain closed throughout this movement.

One form of apparatus for carrying out the process of the invention is shown diagrammatically in the accompanying drawing in transverse section with repetitive details shown dotted in perspective.

In the apparatus, the rods 10, of which five are indicated but which may be fewer or more according to the capacity required of the apparatus, are mounted for reciprocation and linked together at each end by a yoke. (The yokes and driving means are not shown.) Cylindrical mould spaces 11 are drilled at equally spaced intervals along each rod. The rods are driven forwards (to the right in drawing) in steps, each step taking the same time and there being a dwell equal to that time between each two steps. At the end of its forward stroke each rod returns quickly to its initial position and the cycle is then repeated. Above the rods is a hopper 12 having in respect of each rod 10 a chute 13 terminating in an outlet 14 which closely engages the top surface of that rod. The chutes are provided with electromagnetic vibrating means 15.

Immediately forward of the hopper outlet 14 each rod passes through a separate gland 16 into a chamber 17 common to all the rods. In this chamber is a series of spray nozzles 18, one immediately above each rod. The nozzles work on the ejector principle air being drawn in by the movement of the solvent. Each nozzle is fed through a valve 19 from a pipe 20. The inlets of the pipes 20 are near bottom of a tank 21 containing the volatile solvent. The tank, which is provided with a gauge glass 22 and drain cock 23, has an air-tight cover 24. A pressure release valve 25 communicates with the space in the tank above the level of the solvent. Air at 15–20 p.s.i.g. is supplied to the said space in the tank from a main 26 through a supply pipe 27 controlled by a valve 28.

Each rod passes out of the chamber 17 through a separate gland 29 into a solvent recovery chamber 30 common to all the rods. This chamber has an air inlet 31 and an outlet 32 communicating with the suction line of a solvent recovery plant. From the bottom of the chamber 17 a suction pipe 33 communicates with the outlet 32 from the chamber 30.

Each rod passes out of the chamber 30 through an individual gland 34. Beyond this each rod passes under the orifice 35 of an air pipe 26a the outlet from the orifice being controlled by a valve 3. The purpose of this air supply is to eject the filter from its mould space when the rod comes to rest with the mould space under the orifice 35. Below the rod at the ejection station is a chute 37 which directs the filter body on to a conveyor belt 38 on which it is carried under radiation heaters 39 in a drying oven 40 common to all the rods. Suction pipes 41 from this oven communicate with the suction outlet 32 from the chamber 30.

At the end of its run on the conveyor each filter body drops into a cooling bin 42.

Beneath the rods is provided a longitudinally channelled sealing plate 43 supporting each rod in a separate channel. The channels are provided with numerous perforations of such size as to retain the smallest particles of the cellulose acetate used while permitting the passage of air. The sealing plate extends from a little behind the furthermost position to which the rearmost mould space moves on retraction of the rods to as far as chute 37. Since the lands between the channels are imperforate, within the chambers 16 and 30 air is constrained to pass through the mould spaces.

Automatic means are provided for operating the valves 19 and 36 so that: each valve opens when a mould space, immediately after forward motion of the rod, has come to rest beneath the outlet of the pipe controlled by that valve; closes again before forward movement of the rod recommences; and remains closed during the backward movement of the rod.

In the fully retracted positions of the rods the centre of the foremost mould space of each rod is at a distance equal to that between the centres of adjacent mould spaces behind the feed point (i.e. behind the centre of the outlet 14 from the hopper 12). In the fully advanced position the centre of the rearmost mould space of each rod is immediately below the centre of the air orifice 35. It will be appreciated that the distance of the centre of the spray nozzle 18 and the air orifice 35 from the feeding position are integral multiples of the distance between the centres of adjacent mould spaces.

The operation of the apparatus starting with the rods in their fully retracting positions is as follows:

Each rod moves forward until the first mould space comes under the hopper outlet 14 and remains there for a time equal to that taken by the forward movement. During this time the mould space is charged with cellulose acetate particles from the hopper. Each rod then moves forward by one step, again in the same time as before, and then remains at rest, again for the same time. This intermittent movement is repeated until the rod reaches the forward end of its travel. In the course of this travel each mould space in turn has been charged from the hopper outlet 14; has moved under the spray nozzle 18; has rested there and while at rest has received a measured proportion of solvent in the form of fine spray from said nozzle; has moved through the solvent recovery chamber 30 in which excess solvent has been removed by means of an air stream; has moved under the ejector air orifice 35 and remained there while the filter plug was ejected by air from said orifice on to the chute 37.

After the dwell at the forward position the rods are rapidly moved back into the initial position. As indicated above the valves 19 and 36 controlling the solvents spray and ejector air stream, respectively, are closed during this backward motion (and, in fact, during the whole cycle except when a mould space is at rest under the corresponding outlet after a forward movement of the rod).

The ejected filter bodies fall from the chute 37 on to the conveyor belt 38 and the thoroughly dried at an elevated temperature (e.g. at 100° C.) while being carried by the conveyor belt 38 through the drying oven 40. Finally they are discharged from the conveyor belt into the cooling bin 42.

In making cigarette tips by the use of this apparatus the depth of the mould space is made twice the length required in the cigarette filter tip. The filter bodies produced are then of this double length and with curved ends. In making cigarettes using such filter bodies one is inserted between each two lengths of tobacco and the cigarettes are formed by cutting transversely through the centre of each filter body. The curved ends occurring inside the cigarette are not disadvantageous.

It will be appreciated that the apparatus described can be modified in various respects while remaining the same in principle. Thus, for instance, filter bodies with flat ends if required can be made by substituting rods of square section for the rods of round section shown in the drawing, the troughed sealing plate 43 then being replaced by a flat sealing plate perforated under each rod. A slight disadvantage of the adoption of this form of rod is greater difficulty in the construction of satisfactory glands where the rods pass through the walls of the solvent injection chamber and solvent recovery chamber. Instead of a series of rods a flat plate can be employed having rows of mould spaces corresponding to those in the series of rods illustrated.

The apparatus may also be designed to work in a truly continuous manner, e.g., by providing the mould spaces in a moving melt or by feeding a series of rods in continuous succession from a magazine past the various operative stations and back to the magazine.

The following examples illustrate the invention:

*Example 1*

The apparatus was constructed on the same principle as that shown in the drawing but with only one rod, having six mould spaces, with hand operation of the rod and valves without the conveyor belt 38, the ejected filter bodies being transferred by hand to an electric drying oven kept at a temperature of 100° C. and allowed to remain there during the drying. Each mould space was 0.8 cm. in diameter and 1.2 cms. deep.

The mould spaces were loosely charged with cellulose acetate flake of acetyl value 60% all the particles being retained by a 22 mesh sieve and passing a 16 mesh sieve, the sieves being as specified in B. S. No. 410/1943.

After charging there was sprayed into each mould space 1.5 cc. of acetone. Air at room temperature from a supply line at 15 lbs./sq. inch was then passed through each mould space for 2 minutes. The filter body was then ejected from the mould space, transferred to the oven and allowed to remain there for 30 minutes.

The filter body obtained was of length 1 cm., weight 0.35 gm. bulk density 0.69 gm./cc. It passed 18.5 ccs. of air per second under a pressure of 1.5 ins. of water.

*Example 2*

The process was carried out as in Example 1 except that:

The cellulose acetate was of acetyl value 62.2%;

All the particles passed 8 mesh and were retained by 16 mesh sieves of the B. S. No. 410/1943 series;

The solvent used was (for each mould space) 2 ccs. of a mixture of equal volumes of methylene chloride and industrial alcohol;

Instead of employing an air blast to remove excess solvent air was drawn through the mould spaces by applying a vacuum of 10 ins. of mercury for 3 minutes.

The weight of the filter body produced was 0.36 gm., its bulk density was 0.66 gm./cc. and it passed 28.5 ccs. of air per second under a pressure of 1.5 ins. of water.

*Example 3*

The process was carried out as in Example 1 except that cellulose acetate particles were made by cutting dry spun secondary cellulose acetate yarn of 6.5 denier into staple lengths of 3 to 4 mms. and the solvent used was chloroform.

The filter body obtained was of weight 0.11 gm. and bulk density 0.22 gm./cc. and passed 24 ccs. of air per second under a pressure of 1.5 ins. of water.

*Example 4*

Crimped filaments of cellulose acetate were made by melt spinning secondary cellulose acetate (acetyl value 52 to 54%) through star-shaped dies, and exposing the filaments to boiling water for 10 seconds. The filaments were then cut into staple fibres of length 3 to 4 mms. and the process was carried out as in Example 3 except that the air for removing excess solvent was supplied at 3 to 5 p.s.i.g.

The filter bodies obtained were of weight 0.06 gm. and bulk density 0.1 gm./cc. and passed 55 to 63 ccs. of air per second under a pressure of 1.5 ins. of water.

*Example 5*

The process was carried out as described in Example 4, except that the crimping was effected by false-twisting a yarn of the cellulose acetate, setting the twist by the action of heat, and untwisting.

The filter bodies obtained were of weight 0.08 gm., bulk density 0.12 gm./cc. and passed 40 ccs. of air per second under a pressure of 1.5 ins. of water.

*Example 6*

The process of Example 1 was carried out on the apparatus shown in the drawing. The rods were advanced in steps taking 10 seconds each with a dwell of 10 seconds between each two steps. The residence of each mould space in the chamber 30 was 2 minutes. The return stroke of the rods took 5 seconds.

Although cellulose acetate is preferred as the basis for the filter bodies other organic derivatives substitution of cellulose such as cellulose acetate-propionate, cellulose butyrate and ethyl cellulose can be employed. The cellulose esters of paraffinic monocarboxylic acids containing 2 to 4 carbon atoms are particularly suitable. The cellulose derivative may if desired be used in admixture with other non-volatile absorptive substances, e.g. activated charcoal or silica gel.

The filter tips of the present invention are porous, self-sustaining cylindrical bodies composed of coherent particles of solvent-glazed cellulose actate or like derivative of cellulose. The bulk density may range from 0.05 gm./cc. up to 0.8 gm./cc. These tips can, as indicated above, be simply and inexpensively made; they are easily inserted in both matchine-made and hand-made cigarettes; they are tasteless, odourless and non-toxic; they do not cause noticeable resistance to the passage of air in smoking, nor are they attacked by the salivary juices.

Although the invention is particularly useful for forming cigarette filter tips it may be used broadly to form filter bodies for fluids which do not soften or dissolve the cellulose derivative.

Having described our invention, what we desire to secure by Letters Patent is:

1. Process for forming filter tips for cigarettes, which comprises charging a cylindrical space of appropriate size with particles of cellulose acetate, forming the particles into a coherent porous mass by spraying them with a solvent for the cellulose acetate and causing a current of air to pass through said space to evaporate excess of said solvent, the spraying and evaporation being effected without compressing the mass of particles, ejecting the coherent body of particles from said space, and subsequently heating the said body to complete the evaporation of the solvent.

2. Process according to claim 1, which comprises moving a number of mould spaces in succession past a charging station, a solvent spraying station, an air-blowing station, and an ejection station, at the charging station charging each mould space loosely with particles of cellulose acetate, at the spraying station spraying the particles in each mould space with a solvent for the cellulose acetate, at the air-blowing station evaporating excess of said solvent by blowing air through each mould space, the spraying and evaporation being effected without compressing the mass of particles, and at the ejection station ejecting the particles in the form of a porous coherent mass, and causing each of the ejected filter bodies to pass through a heated space in which the evaporation of the solvent is completed.

3. Process according to claim 1, wherein the cellulose acetate has an acetyl value (expressed as acetic acid) of 52 to 54% and the solvent is chloroform.

4. Process according to claim 1, wherein the cellulose acetate has an acetyl value (expressed as acetic acid) of 59 to 62.5% and the solvent is acetone.

5. Process according to claim 1, wherein the cellulose acetate has an acetyl value (expressed as acetic acid) of 59 to 62.5% and the solvent is a mixture of alcohol and methylene chloride in substantially equal proportions by volume.

6. Process for forming filter tips for cigarettes, which comprises charging a cylindrical space of appropriate size with particles of cellulose acetate flake of particle size 8 to 22 mesh forming the particles into a coherent porous mass by spraying them with a solvent for the cellulose acetate and causing a current of air to pass through said space to evaporate excess of said solvent, the spraying and evaporation being effected without compressing the mass of particles, ejecting the coherent body of particles from said space, and subsequently heating the said body to complete the evaporation of the solvent.

7. Process for forming filter tips for cigarettes, which comprises charging a cylindrical space of appropriate size with crimped fibres of length 3 to 4 millimetres of cellulose acetate, forming the particles into a coherent porous mass by spraying them with a solvent for the cellulose acetate and causing a current of air to pass through said space to evaporate excess of said solvent, the spraying and evaporation being effected without compressing the mass of particles, ejecting the coherent body of particles from said space, and subsequently heating the said body to complete the evaporation of the solvent.

8. Process according to claim 6, wherein the cellulose acetate has an acetyl value (expressed as acetic acid) of 59 to 62.5% and the solvent is a mixture of alcohol and methylene chloride in substantially equal proportions by volume.

9. Process according to claim 7, wherein the cellulose acetate has an acetyl value (expressed as acetic acid) of 52 to 54% and the solvent is chloroform.

10. Process according to claim 6, wherein the cellulose acetate has an acetyl value (expressed as acetic acid) of 59 to 62.5% and the solvent is acetone.

References Cited in the file of this patent

UNITED STATES PATENTS

| | | |
|---|---|---|
| 50,070 | Gregg | Sept. 19, 1865 |
| 1,641,049 | Poston | Aug. 30, 1927 |
| 2,297,248 | Rudolph | Sept. 29, 1942 |
| 2,339,979 | Clarke | Jan. 25, 1944 |
| 2,413,735 | Shabaker | Jan. 7, 1947 |
| 2,476,582 | Browne et al. | July 19, 1949 |
| 2,525,135 | Huff | Oct. 10, 1950 |
| 2,662,344 | Knox | Dec. 15, 1953 |

FOREIGN PATENTS

| | | |
|---|---|---|
| 623,964 | Great Britain | May 25, 1949 |
| 730,700 | Great Britain | May 25, 1955 |